United States Patent
Nakamitsu et al.

(10) Patent No.: US 6,773,046 B2
(45) Date of Patent: Aug. 10, 2004

(54) REAR LUGGAGE COMPARTMENT STRUCTURE FOR HATCHBACK VEHICLE

(75) Inventors: Kou Nakamitsu, Aki-gun (JP); Harunori Nagao, Aki-gun (JP); Toshiyuki Manabe, Aki-gun (JP); Naohito Saga, Aki-gun (JP)

(73) Assignee: Mazada Motor Corporation, Hiroshima (JP)

( * ) Notice: Subject to any disclaimer, the term of this patent is extended or adjusted under 35 U.S.C. 154(b) by 0 days.

(21) Appl. No.: 10/396,699

(22) Filed: Mar. 26, 2003

(65) Prior Publication Data

US 2003/0222475 A1 Dec. 4, 2003

(30) Foreign Application Priority Data

Apr. 1, 2002 (JP) ........................................ 2002-098243

(51) Int. Cl.⁷ ................................................. B60N 3/12
(52) U.S. Cl. .................... 296/37.16; 296/37.5; 224/542
(58) Field of Search ............................ 296/37.16, 37.1, 296/37.6, 37.2, 146.6, 69, 76, 24.44, 24.45, 24.43, 37.5; 224/542; 297/146

(56) References Cited

U.S. PATENT DOCUMENTS

| | | | | |
|---|---|---|---|---|
| 2,889,097 A | * | 6/1959 | Broehl | 224/542 |
| 3,891,263 A | * | 6/1975 | Orsulak | 296/24.43 |
| 4,289,345 A | * | 9/1981 | Tamamushi et al. | 296/37.16 |
| 4,718,584 A | * | 1/1988 | Schoeny | 296/37.5 |
| 5,037,154 A | * | 8/1991 | Senba et al. | 296/37.16 |
| 5,324,089 A | * | 6/1994 | Schlachter | 296/37.5 |
| 5,568,890 A | * | 10/1996 | Magee et al. | 296/37.6 |
| 5,598,962 A | * | 2/1997 | Schlachter | 224/542 |
| 5,931,527 A | * | 8/1999 | D'Onofrio et al. | 297/146 |
| 5,967,054 A | * | 10/1999 | Rosenfeld | 108/44 |
| 6,050,202 A | * | 4/2000 | Thompson | 296/37.16 |
| 6,113,172 A | * | 9/2000 | Chaloult et al. | 296/37.16 |
| 6,176,535 B1 | | 1/2001 | Chaloult et al. | |
| 6,318,782 B1 | * | 11/2001 | Suzuki et al. | 296/37.16 |
| 6,406,083 B2 | * | 6/2002 | Bharj et al. | 296/37.16 |
| 6,439,633 B2 | * | 8/2002 | Nemoto | 296/37.16 |
| 6,516,983 B2 | * | 2/2003 | Sotiroff et al. | 224/542 |

FOREIGN PATENT DOCUMENTS

| | | |
|---|---|---|
| DE | 10 09 939 | 6/1957 |
| DE | 25 13 632 | 10/1976 |
| FR | 1 508 091 | 1/1968 |
| JP | 09-048287 | 2/1997 |
| JP | 2000-052871 | 2/2000 |
| JP | 2000-177491 | 6/2000 |
| JP | 2001-328488 | 11/2001 |

OTHER PUBLICATIONS

European Search Report (Dated Jul. 4, 2003).

* cited by examiner

*Primary Examiner*—Kiran Patel
(74) *Attorney, Agent, or Firm*—Nixon Peabody, LLP; Donald Studebaker

(57) ABSTRACT

A rear luggage compartment structure for a hatchback vehicle includes a trunk board comprising front and rear boards which is changeable between a normal position where the front and rear board are laid on front and rear parts of a rear luggage compartment floor, respectively, and a built-up position where the rear board is held upright and the front board is situated horizontally between a rear seat and the rear board held upright so as thereby to create a luggage storage space over the front board that is accessible from a passenger compartment and a secret box under the front board.

17 Claims, 10 Drawing Sheets

REAR LUGGAGE COMPARTMENT STRUCTURE FOR HATCHBACK VEHICLE

BACKGROUND OF THE INVENTION

1. Field of the Invention

The present invention relates to a rear luggage compartment structure for a hatchback or lift back vehicle that is provided with a rack that is positioned at a specified height from a rear luggage compartment floor and is accessible from a passenger compartment so that passengers can put luggage on the rack and lift luggage aside from the rack.

2. Description of Related Art

A rear luggage compartment structure of this kind is known from, for example, Japanese Unexamined Patent publication No. 2001-328488. This rear luggage compartment structure includes a rear package tray that is disposed at a specified height from a rear luggage compartment floor and divided into tow parts, namely a front package tray and a rear package tray. The front package tray is capable of being supported on tops of right and rear wheel housings at an intermediate height between the rear package tray and the rear luggage compartment floor for convenience of the rear luggage compartment of the hatchback vehicle.

The prior art rear luggage compartment structure discloses or suggests no technical idea of making utilization of a trunk board disposed on and extending between longitudinally opposite ends of the rear luggage compartment floor for a parcel rack accessible from a passenger compartment.

SUMMARY OF THE INVENTION

It is therefore an object of the present invention to provide a luggage compartment structure for a hatchback vehicle that incorporates a rack behind a rear seat that is accessible from a passenger compartment for storage of luggage.

It is another object of the present invention to provide a rear luggage compartment structure in which either one of first and second or front and rear trunk boards primarily laid on between front and rear ends of a rear luggage compartment floor is supported as a rack horizontally between a rear seat and another of the first and second or front and rear trunk boards supported upright to form a luggage storage space accessible from a passenger compartment over the rear trunk board and a secret storage space (secret box) under the rear trunk board in the rear luggage compartment.

The foregoing objects of the present invention are accomplished by a rear luggage compartment structure for a hatchback vehicle with a reargate which provides a rear luggage compartment with a luggage rack that is disposed at a specified height from a rear luggage compartment floor behind a rear seat and accessible from a passenger compartment. The rear luggage compartment structure comprises a first trunk board laid on a first part of the rear luggage compartment floor, a second trunk board laid on a second part continuing from the first part of the rear luggage compartment floor and support means for supporting the first trunk board upright on the rear luggage compartment floor and the second trunk board horizontally below a top of the rear seat so as thereby to put the second trunk board available as a luggage rack accessible from a passenger compartment.

According to the rear luggage compartment, it is quite easy to create comparatively small spaces behind the rear seat at vertically opposite sides of the second trunk board in the rear luggage compartment by supporting the first trunk board upright and the second trunk board horizontally. The space over the second trunk board serves as a small luggage storage compartment accessible from the passenger compartment and the space under the second trunk board serves as a secret box. Therefore, the rear luggage compartment structure enhances the convenience of rear luggage compartment.

The rear luggage compartment structure may further comprise a front package tray for covering the luggage storage space over the second trunk board supported horizontally such that the front package tray is capable of turning toward the reargate to uncover the space over the second trunk board. The front package try serves to prevent luggage in the luggage storage space from being burglarized.

The rear luggage compartment structure may further comprise a rear package tray connected to the front package tray through a transverse joint as one integral piece to cover a luggage space left behind the first trunk board supported upright in the rear luggage compartment. The rear package tray is supported to the reargate pivotally mounted to a rear header of the hatchback vehicle, directly or otherwise through a wire or a rod, so as to uncover the luggage space behind the first trunk board when the tailback is open. Since the rear package tray is moved up and down in conjunction with up and down movement of the reargate, the rear package tray improves its operationality for loading and unloading luggage while keeping its ordinary performance.

It is preferred for the front package tray to be foldable toward the reargate along a transverse joint in at least two folds. Since the front package tray is foldable in at least two folds, it is quite easy for a passenger in the passenger compartment to cover and uncover the small luggage storage compartment for putting luggage into the small luggage storage compartment and lifting luggage out of the small luggage storage compartment.

The rear luggage compartment structure may include a floor tray extending over the first and second parts of the rear luggage compartment floor. In this instance, the first and second trunk boards are laid on the first and second parts of the rear luggage compartment floor, respectively, through the floor tray. Further, it is preferred for the support means to comprise a set-in groove formed in a transverse direction in the floor tray so as to retain the first trunk board upright. This makes the support means simple in structure and reliable in operation.

It is preferred to install a rear seat unit comprising a single bench cushion and two separate seatbacks foldable toward the bench cushion independently. It is also preferred that the driver's side rear seatback and the passenger side rear seatback have a transverse proportion of four to six. The rear seat unit can put the space under the second trunk board supported horizontally accessible from the passenger compartment when either or both of the seatbacks are folded down. When folding down one of the seatbacks that is unoccupied by a passenger, the secret box can be easily accessed by a passenger occupying the other seatback.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
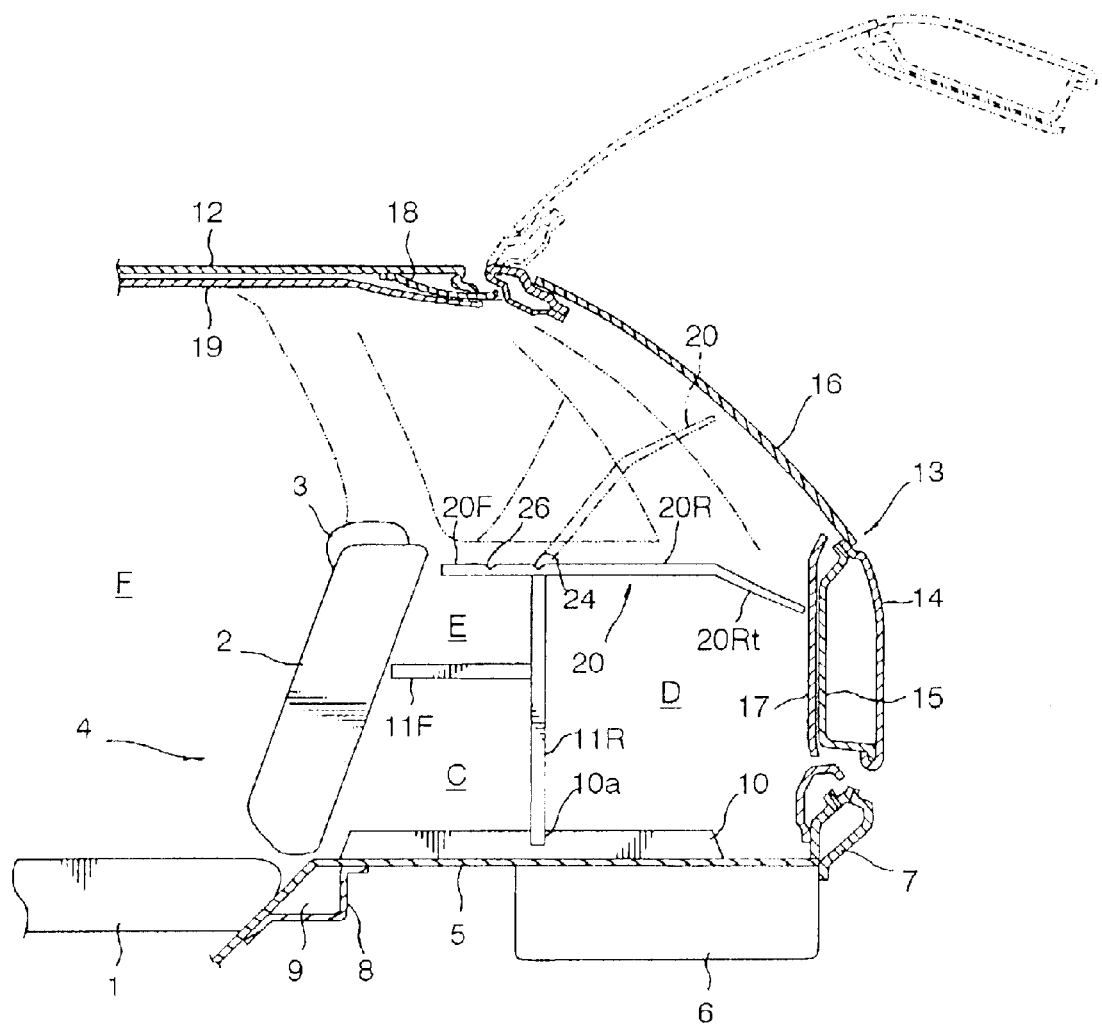
FIG. 1 is a side view of a rear luggage compartment structure for a hatchback vehicle according to an embodiment of the present invention.
Figure 2:
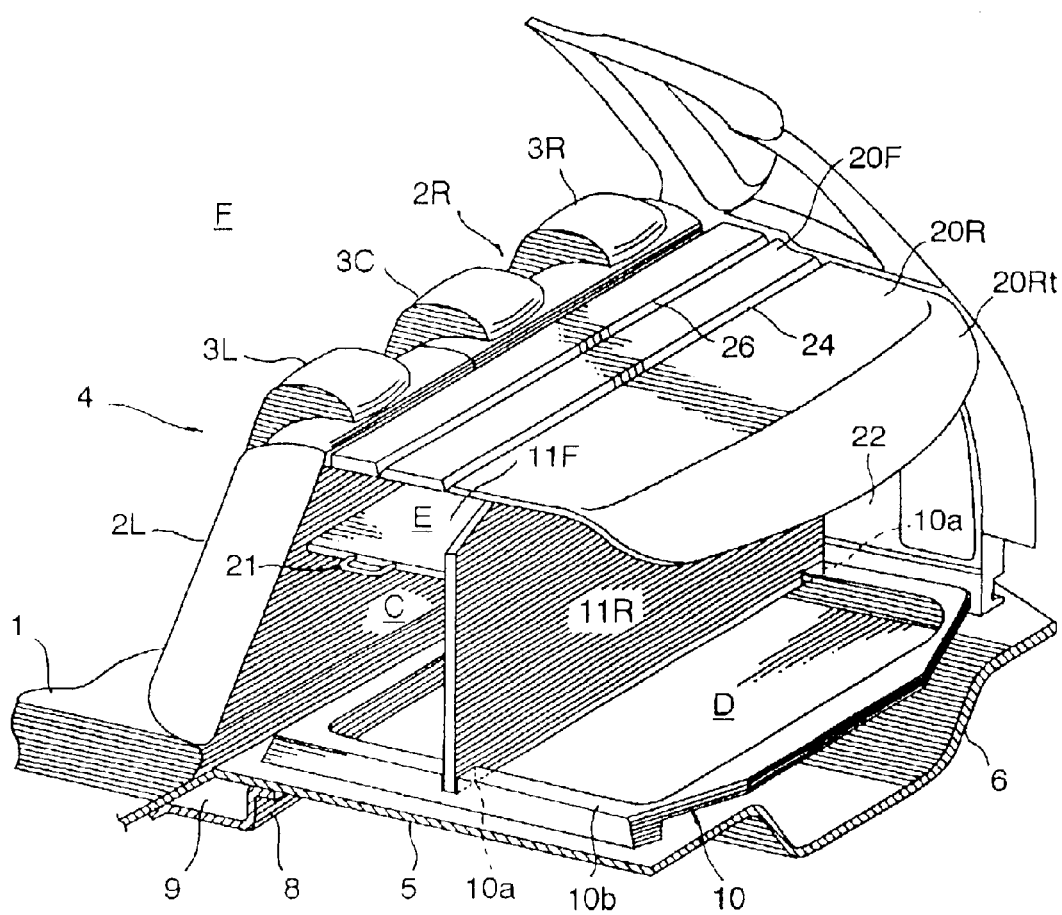
FIG. 2 is a perspective view of an essential part of the rear luggage compartment structure of FIG. 1.
Figure 3:
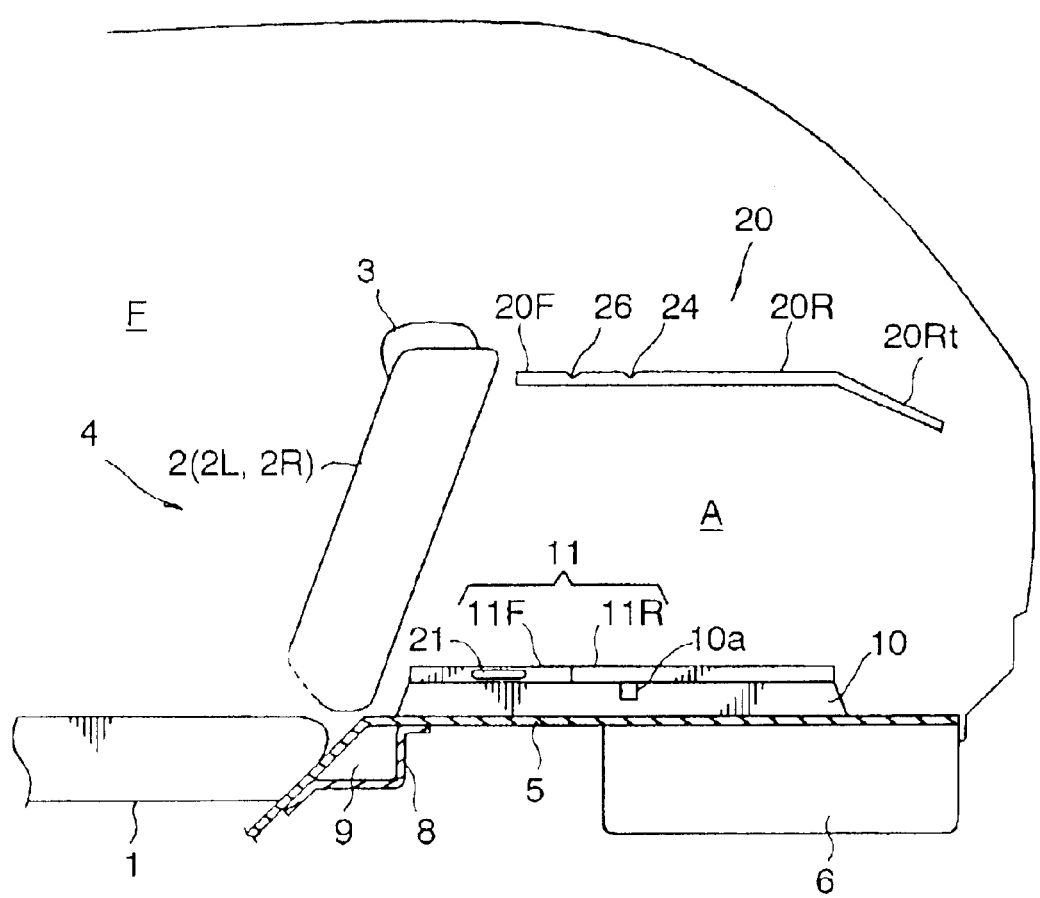
FIG. 3 is a side view of a trunk board in a normal position.

Referring to the drawings in detail, and, in particular, to FIGS. 1 to 3 showing a rear luggage compartment structure for a vehicle such as a hatchback or lift back vehicle, a rear luggage compartment A is provided below a rear package tray 20 and separated from a rear passenger compartment F by a rear bench seat 4 comprising a bench cushion 1, right and left folding seatbacks 2R and 2L (which are collectively called a seatback 2) and right, center and left head restraints 3 (3R, 3C and 3L). As seen in FIG. 2, the right and left seatbacks 2R and 2L have a transverse proportion of, for example, four to six. A rear floor panel 5 of the vehicle forms a floor part of the rear luggage compartment A. The rear floor panel 5 at its rear end is provided with a spare tire pan 6 attached thereto from its underside and a rear end panel 7 extending crosswise. These luggage compartment floor panel 5 and rear end panel 7 are desirably formed as an integral piece or welded or otherwise secured as an integral piece. The luggage compartment floor panel 5 at its front end has a kick-up configuration and is provided with a cross-beam 8 welded of otherwise secured thereto from the underside so as to form a closed cross-section 9 therebetween. The crossbeam 8 functions as a rigid constructional member for increasing the rigidity of the hatchback body. As shown in FIG. 3, the luggage compartment floor panel 5 is provided with a floor tray 10 laid thereon between front and rear ends of the rear luggage compartment A. A trunk board 11 is disposed on the floor tray 10 and extends entirely from a front end and a rear end of the floor tray 10. The trunk board 11 comprises two sections, namely a front trunk board 11F and a rear trunk board 11R.

The hatchback vehicle is equipped with reargate 13 that opens and closes a rear hatch of the rear luggage compartment A. The reargate 13 at its top end is pivotally mounted to a rear end (a rear header) of a roof panel 12 for up and down movement. Specifically, the reargate 13 comprises a reargate outer panel 14 having a rear window opening, a reargate inner panel 15 having a rear window opening, a reargate trim panel 17 attached to the reargate inner panel 15 and a rear windshield 16 disposed in the rear window openings. The roof panel 12 at its rear end is provided with a transverse rear header 18 welded, or otherwise secured, thereto. The roof panel 12 including the rear header 18 is trimmed with a ceiling covering 19.

As was previously described, the trunk board 11 comprises the front trunk board 11F and the rear trunk board 11R. The front trunk board 11F and the rear trunk board 11R have a lengthwise proportion of approximately 3.5 to approximately 6.5. The trunk board 11 is formed so as to be changeable between two positions, namely a normal position as shown in FIG. 3 and a built-up position as shown in FIGS. 2 and 3. In the normal position, the front trunk board 11F and the rear trunk board 11R are put horizontal on the floor tray 10. In the built-up position, the rear trunk board 11R fixedly stands upright in the vicinity where the front trunk board 11F at its rear end occupies in the normal position, and the front trunk board 11F is firmly held horizontally between and below the tops of the seatback 2 and the rear trunk board 11R standing upright. When the trunk board 11 is in the normal position, the rear luggage compartment A forms an uninterrupted space that is comparatively large between the floor tray 10 and the rear package tray 20. On the other hand, when the trunk board 11 is in the built-up position, the rear luggage compartment A is divided into three luggage compartment sections, namely a secret box C defined by the rear seatback 2, the front trunk board 11F positioned horizontally below the top of the seatback 2 and the rear trunk board 11R standing upright, a utility space E defined as a luggage space over the front trunk board 11F by the rear seatback 2, the front trunk board 11F, the rear trunk board 11R and a front part of the rear package tray 20 above the secret box C, and a rear luggage compartment D defined by the rear trunk board 11R and a rear part of the rear package tray 20.

Figure 4:
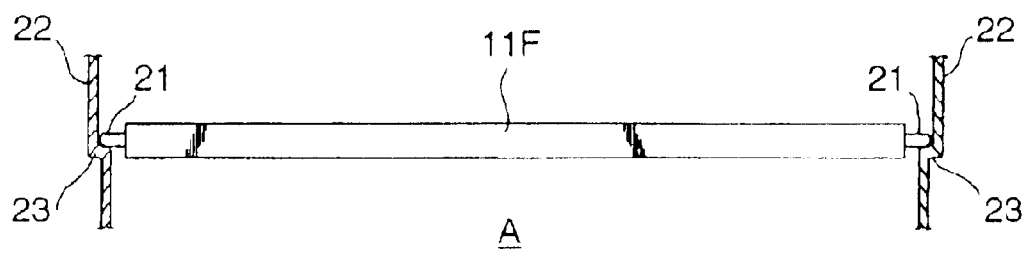
FIG. 4 is a cross-sectional view of a support structure for a front board.

The trunk board 11 is put and held in the built-up position by support means comprising a first support for supporting the rear trunk board 11R upright and a second support for supporting the front trunk board 11F horizontally. As shown in detail in FIG. 2, the floor tray 10 is provided with the first support comprising set-in grooves 10a formed in a brim 10b at transversely opposite positions so as to receive and hold the rear trunk board 11R in the upright position. As shown in FIG. 4, the second support comprises hooks 21 secured as handles to transversely opposite ends of the front trunk board 11F, respectively, and shoulders 23 formed on opposite rear side trim panels 22. The front trunk board 11F is situated horizontally by placing the hooks 21 on the shoulders 23.

Figure 5:
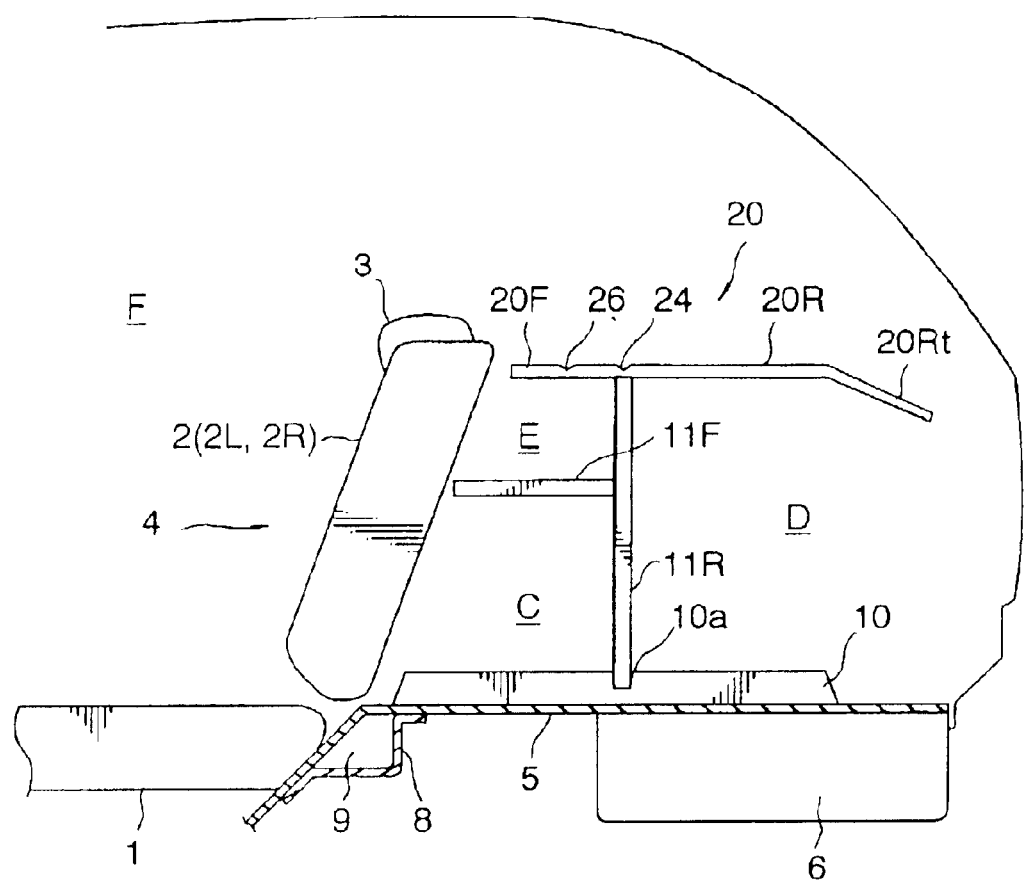
FIG. 5 is a side view of a formation of a rack.

Referring to FIGS. 2 and 5 showing the rear package tray 20 in detail, the rear package tray 20 comprises a front tray section 20F and a rear tray section 20R with an inclined tail 20Rt extending rearward therefrom. The rear package tray 20 has a first transverse joint 24 extending transversely between the front and rear tray sections 20F and 20R and at least one second transverse joint 26 in parallel with the first transverse joint 24 formed in the front tray section 20F so as to be foldable along these transverse joints. In other words, the first transverse joint 24 divides the rear package tray 20 into the front and rear tray sections 20F and 20R, and the second transverse joint 26 divides the front tray section 20F into two subsections, namely a front subsection 20Ff and a rear subsection 20Fr. As shown in FIG. 1, the rear package tray 20 at its rear end is detachably suspended from the reargate 13 by means of a wire or a rod (not shown) so that the rear tray section 20R is swung up along the first transverse joint 24 to an open position shown by an imaginary line from a closed position shown by a solid line when the reargate 13 is opened. The front tray section 20F is foldable in two folds along the second transverse joint 26. In other words, the rear package tray 20 is foldable in three folds along the first and second transverse joints 24 and 26.

Figure 6:
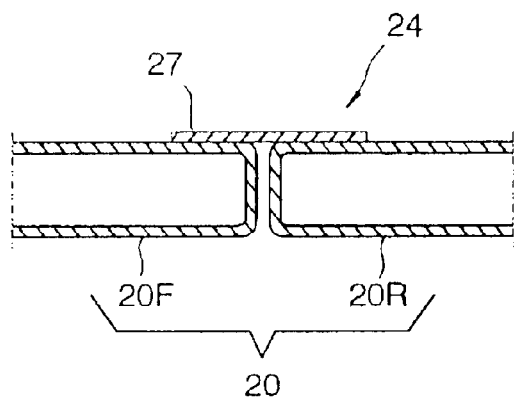
FIG. 6 is a cross-sectional view of a support structure.
Figure 7:
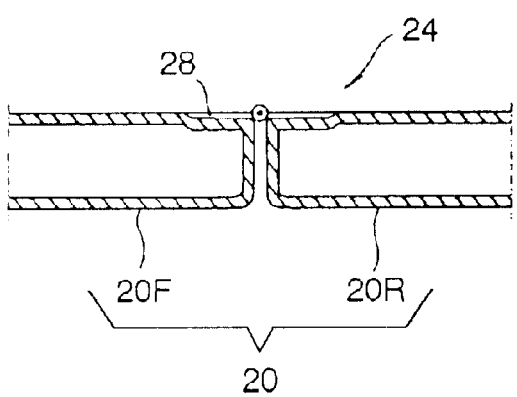
FIG. 7 is a cross-sectional view of another support structure.
Figure 8:
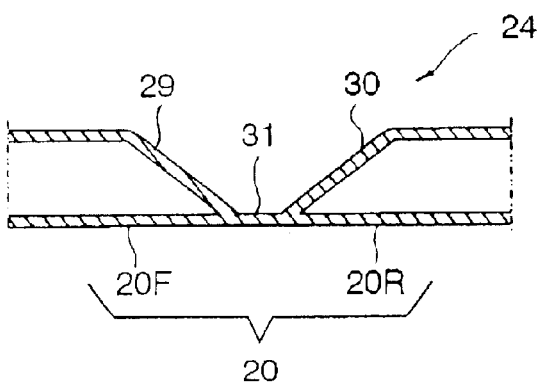
FIG. 8 is a cross-sectional view of still another support structure.

The rear package tray 20 may be made up of separates pieces or otherwise may be formed as one integral piece. In any case, each of the first and second transverse joints 24 and 26 may take any form well known to those skilled in the art. Specifically, in the case where the rear package tray 20 may be made up of separate front and rear tray sections, the first transverse joint 24 may comprise a flexible joint such as fabric as shown in FIG. 6. Alternatively, the first transverse joint 24 may comprise a hinge 28 as shown in FIG. 7. In the case where the rear package tray 20 is formed as one integral piece, the first transverse joint 24 may be formed as a wedge-shaped furrow comprising a slant wall 29 forming a rear end of the front tray section 20F, a slant wall 30 forming a front end of the rear tray section 20R and a flexible bottom wall 31 connecting the front and rear tray sections 20F and 20R as shown in FIG. 8. The second transverse joint 26 can take the same or similar form as the first transverse joint 24.

The following description will be directed to operation of the rear luggage compartment structure explained above by way of example. When the trunk board 11 is in the normal position shown in FIG. 3, a comparatively large space is created as the rear luggage compartment A between the trunk board 11 and the rear package board 20 behind the rear seat 4. The trunk board 11 is put into the upright position shown in FIG. 5 by supporting the rear trunk board 11R by the first support, i.e. fitting the rear trunk board 11R in the set-in grooves 10a of the brim 10b thereby to hold it upright and supporting the front trunk board 11F by the second support, i.e. putting the hooks 21 of the front trunk board 11F on the shoulders 23 of the opposite rear side trim panels 22 to situate it horizontally. In the upright position, there are created three spaces, the secret box C surrounded by the rear seat 4 and the front and rear boards 11F and 11R of the trunk board 11, the rear luggage compartment D defined by the rear trunk board 11R of the trunk board 11 and the rear tray section 20R of the rear package tray 20 behind the secret box C, and the utility space E defined over the front trunk board 11F by the rear seatback 2 and the front tray section 20F of the rear package tray 20.

Figure 9:
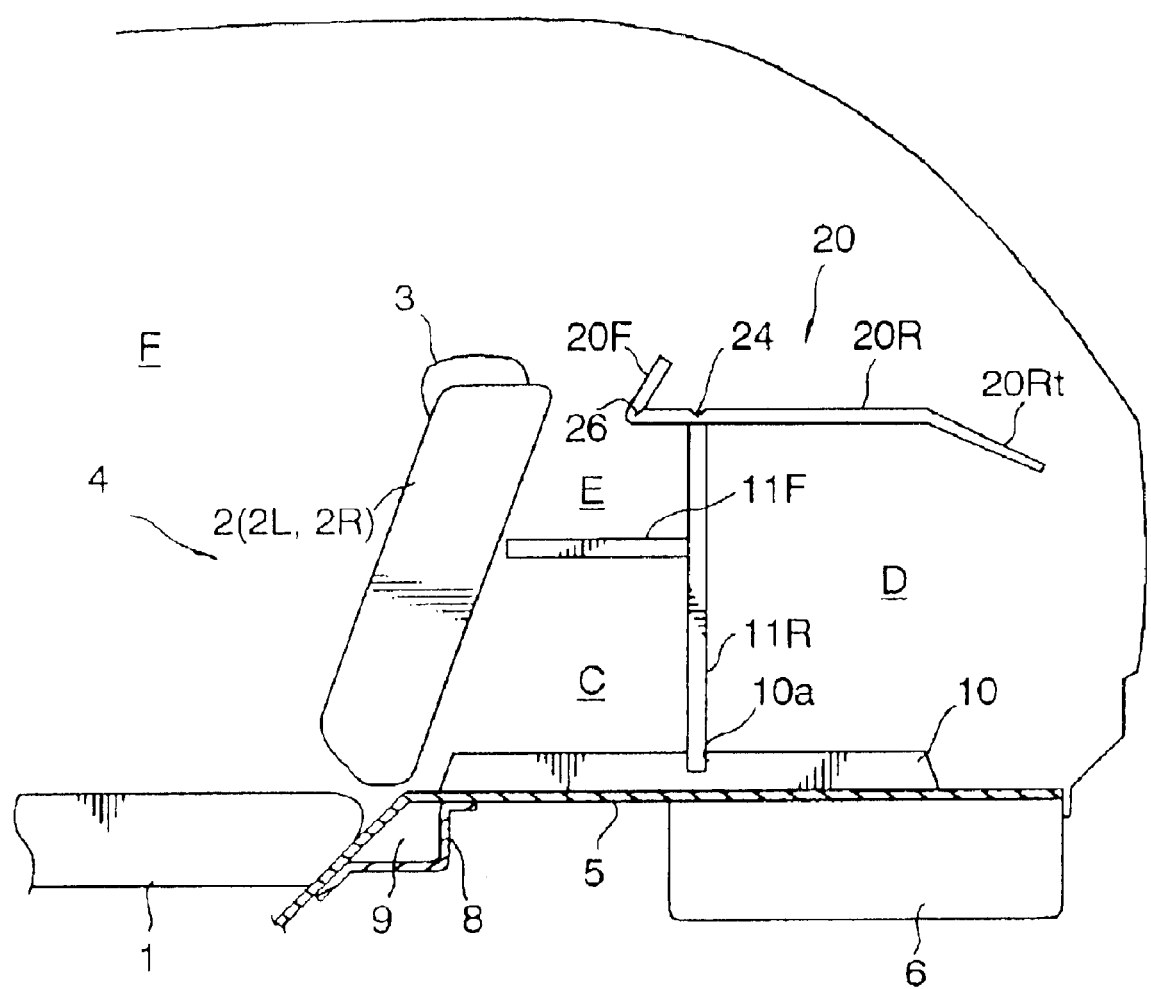
FIG. 9 is a side view of the rear luggage compartment showing a front package tray folded in tow folds.
Figure 10:
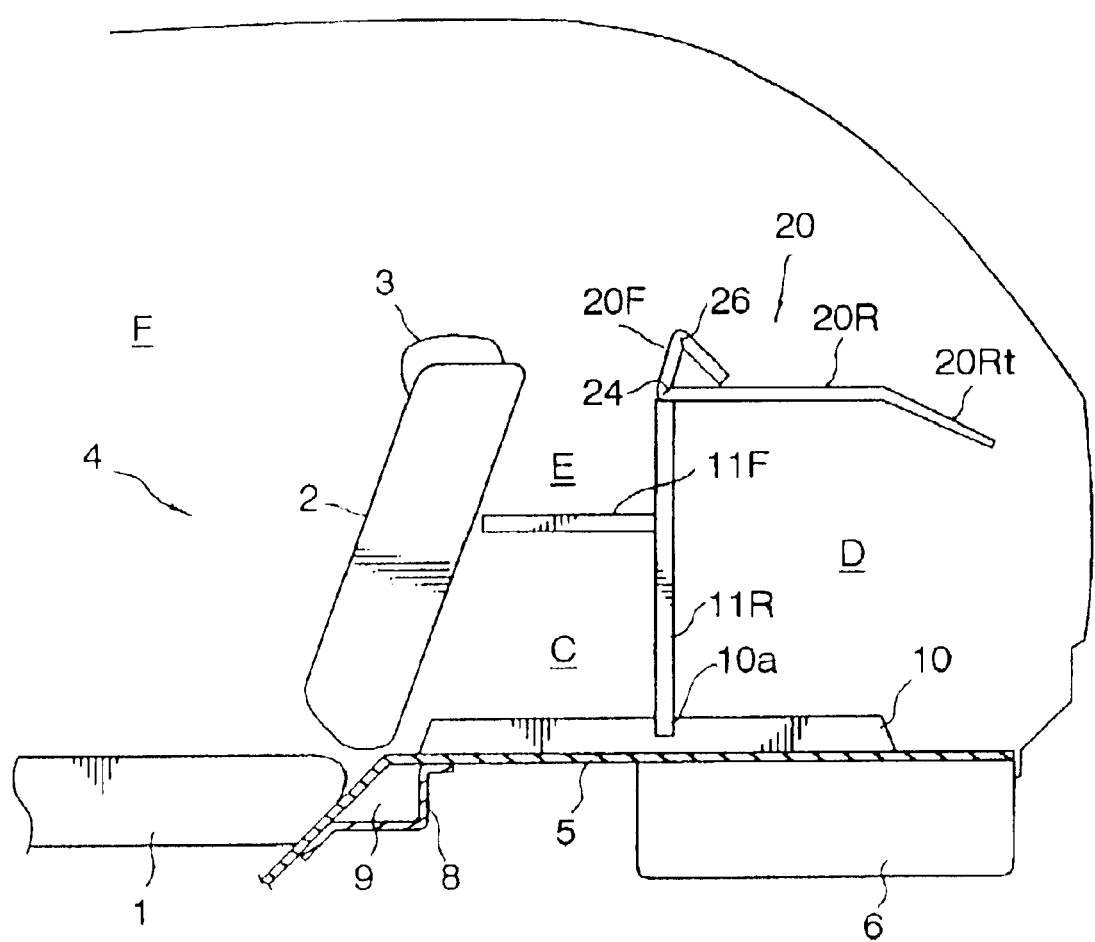
FIG. 10 is a side view of the rear luggage compartment showing the rack opened.

As shown in FIGS. 9 and 10, the utility space E is put accessible by folding the front tray section 20F of the rear package tray 20 in two steps. Specifically, the utility space E is opened from the side of the rear seat 4 by folding the front subsection 20Ff of the front tray section 20F backward toward the rear subsection 20Fr of the front tray section 20F and further folding the rear subsection 20Fr of the front tray section 20F backward toward the rear tray section 20R while the trunk board 11 occupies the upright position shown in FIG. 5. This allows a passenger to put luggage in and out of the utility space E from the side of the rear seat 4.

Figure 11:
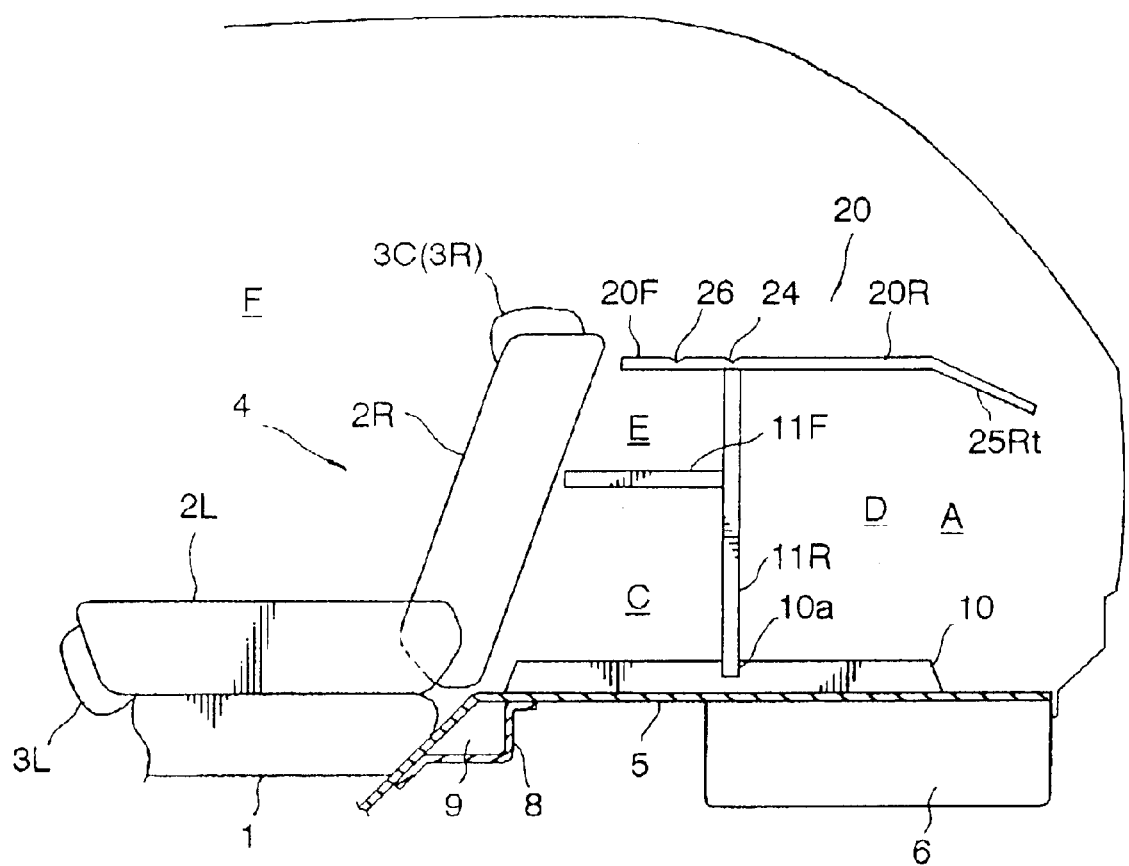
FIG. 11 is a view of the rear luggage compartment when a seatback of a bench seat is inclined.

Referring to FIG. 11, when folding either one or both of the right and left seatbacks 2R and 2L, for example the left seatback 2L, forward down while the trunk board 11 is in the upright position shown in FIG. 5, the passenger compartment F is opened to both the secret box C and the utility space E. This allows a passenger sitting on the rear seat 4 to access luggage in the secret box C and/or the utility space E.

Figure 12:
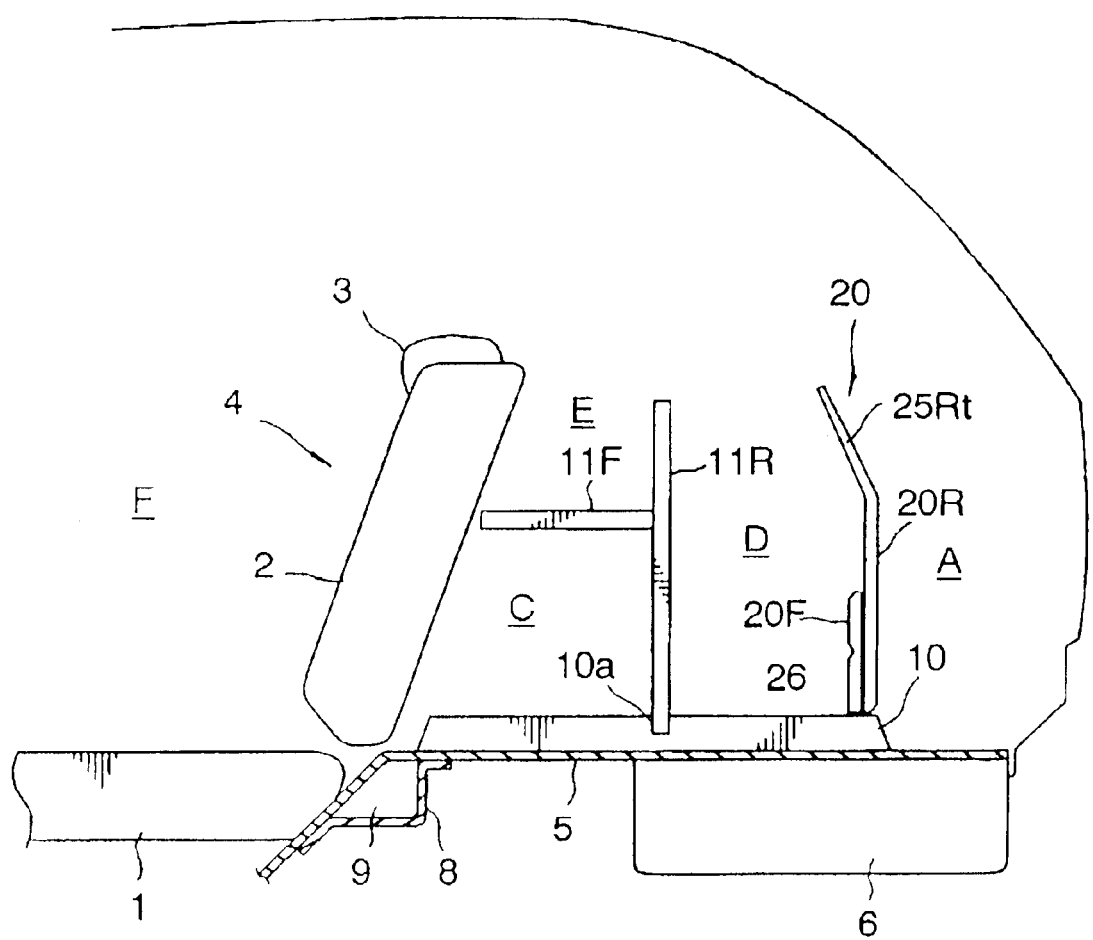
FIG. 12 is a cross-sectional view of another support structure for the front board.

Referring to FIG. 12, the rear package tray 20 is detached and stood upright with the front tray section 20F folded along the first transverse joint 24 against the rear tray section 20R at a rear end of the floor tray 10. The rear package tray 20 thus arranged prevents luggage from dropping out of the rear luggage compartment A or D while the reargate 13 is open.

Figure 13:
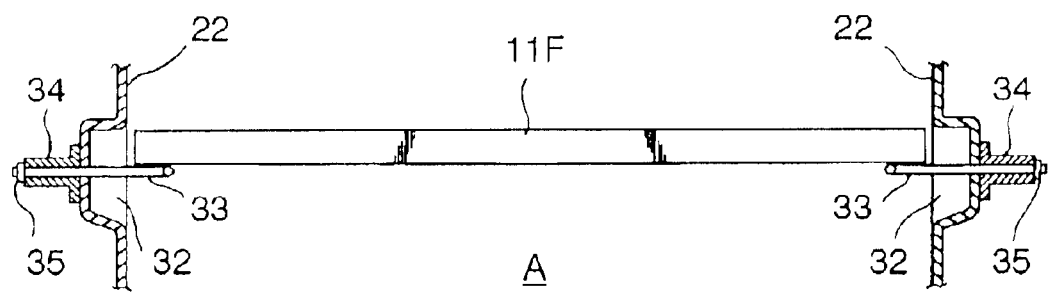
FIG. 13 is a view of the rear luggage compartment prepared to prevent luggage from falling down.

FIG. 13 shows a variation of second support of the support means for supporting the trunk board 11 in the built-up position. The second support comprises a generally U-shaped backstay 33 and a guide boss 34 installed to each of opposite rear side trim panels 22. The U-shaped backstay 33 has a pair of stem sections retractably received in guide bores of the guide boss 34 and connected by a crossbar section at the side of the rear luggage compartment A. The U-shaped backstay 33 is provided with a stopper 35 at a free end of the stem section so that the U-shaped backstay 33 is prevented from coming off from the guide boss 34. The rear side trim panel 22 has a recess 32 for allowing access to the U-shaped backstay 33 for pulling out and pushing in the U-shaped backstay 33. When it is intended to put the trunk board 11 in the built-up position, the U-shaped backstays 33 are pulled out from the guide bosses 34 to a position shown in FIG. 13 so as to support the front trunk board 11F horizontally thereon. On the other hand, when putting the trunk board 11 into the normal position, the U-shaped backstays 33 are pushed into the guide bosses 34 after having removed the front trunk board 11F. Another pair of the second support may be provided.

As described above, the rear luggage compartment structure for a hatchback vehicle which provides a rear luggage compartment A on a floor behind a rear seat and has a luggage rack that is disposed at a specified height from the luggage compartment floor behind the rear seat and accessible from the inside of the passenger compartment comprises a first or front trunk board laid on a first part of the rear luggage compartment floor and having a lengthwise width greater than the specified height and a second or rear trunk board laid on a second part of the rear luggage compartment floor. The first trunk board is supported by a first support, e.g. set-in grooves formed in the floor tray on the rear luggage compartment floor, so as thereby to stand upright, and the second trunk board is on a second support fixed to a rigid structure e.g. rear side trim panels, of the vehicle to be situated horizontally below a top of the first trunk board standing upright so as to serve as the luggage rack.

According to the rear luggage compartment structure, it is quite easy to form a utility space E over the first trunk board that is easily accessible from the passenger compartment F and enhances storage convenience and a secret box (a small luggage compartment) C below the first trunk board in a flexible and impromptu manner by fixedly standing the second trunk board upright and situating the first trunk board horizontally or substantially horizontally below the top of the second trunk board standing upright. This improves the storage convenience of the rear luggage compartment.

The rear luggage compartment structure includes the front package tray supported above the second trunk board situated horizontally so as to turn back and forth. This package tray puts the utility space formed over the second trunk board in the built-up position accessible from the passenger compartment when it is turned back toward the reargate and is helpful in preventing luggage in the utility space from being burglarized.

The rear luggage compartment structure includes the rear package tray connected to the front package tray and supported above the second trunk board situated horizontally. The rear package tray is supported to the reargate pivotally mounted to the rear header of the hatchback vehicle, directly or indirectly, so as to uncover the luggage compartment behind the first trunk board standing upright when the reargate is open. Since the rear package tray is moved up and down in conjunction with opening and losing movement of the reargate, the rear package tray improves its own operationality for loading and unloading luggage while keeping its ordinary performance.

The front package tray is foldable toward the reargate along a transverse joint in at least two folds. Therefore, it is quite easy for a passenger in the passenger compartment to cover and uncover the small luggage storage compartment for putting luggage into the luggage storage compartment and lifting luggage out of the small luggage storage compartment. The support means that comprises the set-in grooves formed in the floor tray that receive and retain the first trunk board upright. This makes the support means simple in structure and reliable in operation.

The rear seat unit comprises a single bench cushion and two separate seatbacks foldable toward the bench cushion independently. The rear seat unit can put the secret box under the second trunk board supported horizontally accessible from the passenger compartment when either or both of the seatbacks are folded down. When folding down one of the seatbacks that is unoccupied by a passenger, the secret box can be easily accessed by a passenger occupying the other seatback.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A rear luggage compartment structure for a hatchback vehicle with a reargate which provides a rear luggage compartment on a floor behind a rear seat and has a luggage rack disposed at a specified height from the floor behind the rear seat so as to be accessible from a passenger compartment, said rear luggage compartment structure comprising:

a first trunk board laid on a first part of the rear luggage compartment floor and having a lengthwise width greater than said specified height;

a second trunk board laid on a second part continuing from said first part of the rear luggage compartment floor;

support means for supporting said first trunk board upright on said rear luggage compartment floor and said second trunk board horizontally below a top of said rear seat so as thereby to put said second trunk board available as said luggage rack.

2. A rear luggage compartment structure as defined in claim 1, and further comprising a front package tray for covering a space formed over said second trunk board supported horizontally by said second trunk board supported upright in said rear luggage compartment, wherein said front package tray is capable of turning toward said reargate to uncover said space formed over said second trunk board by said first trunk board.

3. A rear luggage compartment structure as defined in claim 2, and further comprising a rear package tray connected to said front package tray through a transverse joint to cover a space formed in said luggage compartment behind said first trunk board supported upright, wherein said rear package tray is supported by said reargate pivotally mounted to a rear header of said hatchback vehicle so as to uncover said space behind said first trunk board when said tailback is open.

4. A rear luggage compartment structure as defined in claim 2, wherein said front package tray is foldable toward said reargate along a transverse joint in at least two folds.

5. A rear luggage compartment structure as defined in claim 2, and further comprising a floor tray extending over said first and second parts of said rear luggage compartment floor, wherein said first and second trunk boards are laid on said first and second parts of said rear luggage compartment floor, respectively, through said floor tray.

6. A rear luggage compartment structure as defined in claim 5, wherein said support means comprises a set-in groove formed in a transverse direction in said floor tray so as to retain said first trunk board upright.

7. A rear luggage compartment structure as defined in claim 6, wherein said rear seat comprises a single bench cushion and two separate seatbacks, each said seatback being foldable toward said bench cushion so as to put a space formed in said rear luggage compartment under said second trunk board supported horizontally accessible from said passenger compartment.

8. A rear luggage compartment structure as defined in claim 2, wherein said rear seat comprises a single bench cushion and two separate seatbacks, each said seatback being foldable toward said bench cushion so as to put a space formed in said rear luggage compartment under said second trunk board supported horizontally accessible from said passenger compartment.

9. A rear luggage compartment structure as defined in claim 1, and further comprising a floor tray extending over said first and second parts of said rear luggage compartment floor, wherein said first and second trunk boards are laid on said first and second parts of said rear luggage compartment floor, respectively, through said floor tray.

10. A rear luggage compartment structure as defined in claim 9, wherein said support means comprises a set-in groove formed in a transverse direction in said floor tray so as to retain said first trunk board upright.

11. A rear luggage compartment structure as defined in claim 10, wherein said rear seat comprises a single bench cushion and two separate seatbacks, each said seatback being foldable toward said bench cushion so as to put a space formed in said rear luggage compartment under said second trunk board supported horizontally accessible from said passenger compartment.

12. A rear luggage compartment structure as defined in claim 9, and further comprising a rear package tray connected to said front package tray through a transverse joint to cover a space formed in said luggage compartment behind said first trunk board supported upright, wherein said rear package tray is supported by said reargate pivotally mounted to a rear header of said hatchback vehicle so as to uncover said space behind said first trunk board when said tailback is open.

13. A rear luggage compartment structure as defined in claim 9, wherein said front package tray is foldable toward said reargate along a transverse joint in at least two folds.

14. A rear luggage compartment structure as defined in claim 9, wherein said rear seat comprises a single bench cushion and two separate seatbacks, each said seatback being foldable toward said bench cushion so as to put a space formed in said rear luggage compartment under said second trunk board supported horizontally accessible from said passenger compartment.

15. A rear luggage compartment structure as defined in claim 1, wherein said rear seat comprises a single bench cushion and two separate seatbacks, each said seatback being foldable toward said bench cushion so as to put a space formed in said rear luggage compartment under said second trunk board supported horizontally accessible from said passenger compartment.

16. A rear luggage compartment structure as defined in claim 1, and further comprising a rear package tray connected to said front package tray through a transverse joint to cover a space formed in said luggage compartment behind said first trunk board supported upright, wherein said rear package tray is supported by said reargate pivotally mounted to a rear header of said hatchback vehicle so as to uncover said space behind said first trunk board when said tailback is open.

17. A rear luggage compartment structure as defined in claim 1, wherein said front package tray is foldable toward said reargate along a transverse joint in at least two folds.

* * * * *